United States Patent
Tait

[15] 3,634,997
[45] Jan. 18, 1972

[54] METHOD AND APPARATUS FOR PRODUCING ASEPTICALLY PACKAGED STERILE ARTICLES

[72] Inventor: Thomas Theodore Tait, 9-11, The Quadrant, Richmond upon Thames, Surrey, England

[22] Filed: Oct. 22, 1968

[21] Appl. No.: 769,557

[30] Foreign Application Priority Data

Oct. 27, 1967 Great Britain .................. 49,052/67

[52] U.S. Cl. .................................. 53/127, 53/25, 53/122
[51] Int. Cl. ............... B65b 55/14, B65b 63/08, B65b 67/10
[58] Field of Search .......................... 53/2, 25, 111, 127

[56] References Cited

UNITED STATES PATENTS

| | | | |
|---|---|---|---|
| 2,215,193 | 9/1940 | Reece | 53/127 X |
| 2,685,520 | 8/1954 | Martin | 53/25 X |
| 2,775,079 | 12/1956 | Sarofeen | 53/127 X |
| 2,918,770 | 12/1959 | Stocker | 53/127 X |
| 3,376,688 | 4/1968 | Takacs | 53/21 FC |
| 3,401,043 | 9/1968 | Finley | 53/111 RC |
| 3,516,218 | 6/1970 | Eisler | 53/25 |

FOREIGN PATENTS OR APPLICATIONS

| | | | |
|---|---|---|---|
| 671,716 | 12/1960 | Canada | 53/21 FC |
| 877,372 | 9/1961 | Great Britain | 53/111 RC |

*Primary Examiner*—Wayne A. Morse, Jr.
*Attorney*—McGlew and Toren

[57] ABSTRACT

Aseptically packaged articles made of a plastics material are made by forming them in a moulding machine at a sterilizing temperature, introducing them while sterile from the machine into a stream of sterile air and packing them in a sterile wrapping in that stream of sterile air.

6 Claims, 5 Drawing Figures

PATENTED JAN 18 1972

3,634,997

INVENTOR
THOMAS THEODORE TAIT

BY McGlew and Toren
ATTORNEYS

METHOD AND APPARATUS FOR PRODUCING ASEPTICALLY PACKAGED STERILE ARTICLES

This invention relates to aseptically packaged sterile articles made from a plastics compound and to a method of and apparatus for manufacturing them.

Hitherto, in the manufacture of aseptically packaged articles, the steps taken to prevent contamination of these articles included either sterilization by heat, sterilization by means of bactericides or in the case of articles which were inherently aseptic by reason of their mode of manufacture packaging them in a sterile atmosphere. Articles made from plastics compounds, as by injection moulding or extrusion and blow moulding are inherently sterile by reason of being formed at a temperature at which sterilization takes place and it is with such articles that the invention is particularly concerned.

According to one aspect of the present invention there is provided a method of producing aseptically packaged sterile articles made of a plastics material wherein the articles are formed in a moulding machine from a plastics compound at a sterilizing temperature, the moulded articles while sterile are introduced from the moulding machine into a stream of sterile air where the articles are packed in a sterile wrapping. The articles may if appropriate be assembled to some other sterile integer or integers before being packed.

According to another aspect of the present invention there is provided an apparatus for producing aseptically packaged sterile articles made of a plastics material, said apparatus including a moulding machine capable of moulding articles from plastics compound at a sterilizing temperature, means for introducing the articles without risk of contamination to a packing location, means for producing a stream of sterile air across the packing location, the arrangement being such that access may be had to the packing location from downstream of the stream of sterile air for packaging of the articles.

The packing location may be a balanced room, i.e., a room in which the quantity of air blown in is balanced by the air removed, the pressure in the room being the same as the ambient pressure. Preferably the stream of sterile air is produced by a laminar flow technique.

According to yet another of its aspects, the present invention provides aseptically packaged sterile articles when made by the method or upon the apparatus described above.

In order that the invention may be clearly understood and readily carried into effect, some embodiments thereof will now be described, by way of example only, with reference to the accompanying drawings, wherein.

Figure 1:
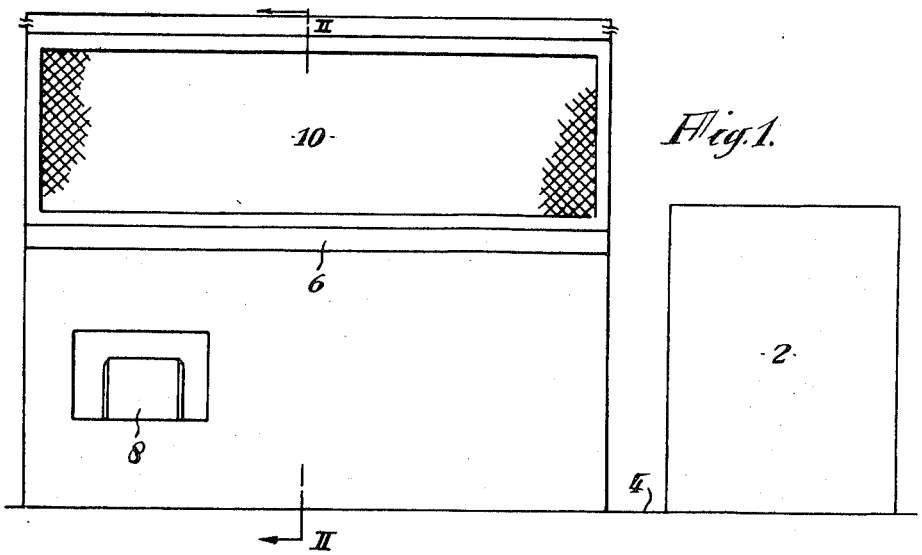
FIG. 1 is a diagrammatic representation of one form of apparatus embodying the present invention.
Figure 2:
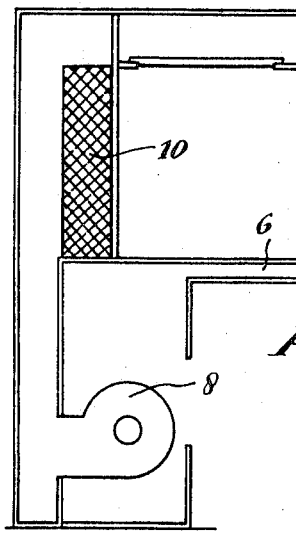
FIG. 2 is a section on line II—II of FIG. 1.

Referring to FIGS. 1 and 2 a moulding machine 2 is shown disposed upon a floor 4 of a room. In the machine 2, a plastics material is supplied and/or moulded at a temperature sufficient to result in the production of inherently sterile articles in the moulds. The moulded articles are introduced from the machine by a conveyor (not shown) to a packing location in the form of a bench 6 over which a laminar stream of sterilized air is blown. The stream of sterile air is provided, as will be seen from FIG. 2, by means of a blower 8 drawing air in from the surrounding atmosphere and supplying it to the bench 6 through a filter 10. While the articles are on the bench 6 they are packed either by hand or by mechanical means in sterile envelopes after assembly thereto of any other required sterile components. Access to the bench 6 is from the side of the bench remote from the filter 10, i.e., from downstream. The laminar stream of sterile air carries away any airborne contamination generated at the bench 6 and prevents articles produced in the moulding machine from becoming contaminated by contact with the surrounding unsterilized air.

Figure 3:
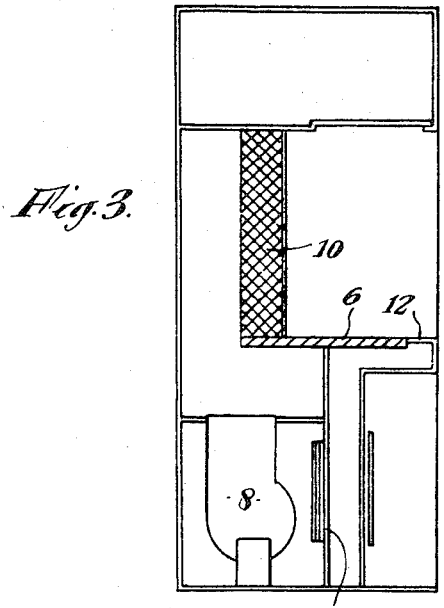
FIG. 3 shows a modified form of apparatus in cross section corresponding to FIG. 2.

In the apparatus shown in FIG. 3, air is removed through a grille 12 from the front of the bench 6 downstream of the center of the bench where packing actually takes place. Removal of air is due to suction induced by the blower 8. The removed air passes through an additional filter 14 before being recirculated to the packing location by the blower 8 and by way of the filter 10 mounted at the rear of the bench 6 upstream of where packing actually takes place.

Figure 4:
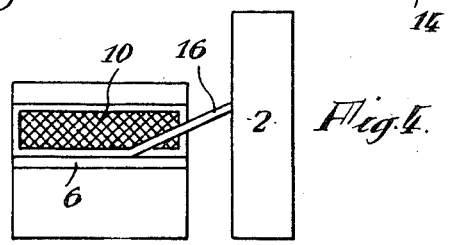
FIG. 4 illustrates (to a smaller scale) a further form of apparatus embodying the invention; and, FIG. 5 shows in plan view (to a much reduced scale) a balanced room embodying the invention.

In FIG. 4 the moulding machine is shown provided with a chute 16 for introducing the sterile articles to the bench 6. The chute 16 is provided with a blower (not shown) for passing sterile air over the articles to prevent contamination thereof while in the chute 16; alternatively some of the sterile air coming from the filter 10 may be diverted up the chute towards the moulding machine.

Figure 5:
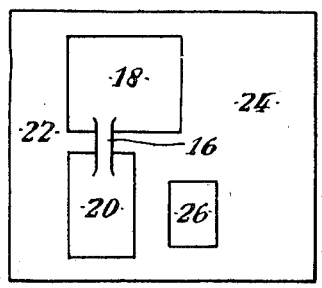

In the arrangement shown in FIG. 5 the articles produced in a moulding machine 18 are passed directly down a chute 16 onto a bench 20. The moulding machine and the bench are situated in a room through which sterile air is blown and removed; flow of sterile air in the room is laminar, going from one wall 22 to a wall 24 facing it. A chair 26 is placed downstream of the bench 20. The flow is balanced, i.e., the quantity blown in equals the quantity evacuated and the room pressure remains the same as ambient pressure. In a modification of this arrangement (not shown) the moulding machine is disposed outside the balanced room and the articles produced in the machine are introduced into the room down a chute.

What I claim and desire to secure by Letters Patent is:

1. Apparatus for aseptically packaging sterile articles made of a plastic material within a working space containing a nonsterile ambient atmosphere, comprising a molding machine capable of molding articles from a plastics compound at a sterilizing temperature, a bench spaced from said molding machine and located within the unsterilized atmosphere, said bench providing a horizontal surface for packaging the molded article in a sterile wrapping, means for conveying the molded articles from said molding machine to said bench and for maintaining said molded articles in the sterile condition during passage from said molding machine to said bench, and means for providing a flow of sterile air across the horizontal packaging surface of said bench from one side thereof for maintaining a sterile atmosphere for carrying out the packaging operation and so that direct access is available to the horizontal packaging surface of said bench from a location downstream in the direction of the flow of sterile air in which downstream location sterile conditions do not prevail.

2. Apparatus, as set forth in claim 1, wherein said means for providing a flow of sterile air comprises a blower mounted adjacent said bench for drawing air in from the surrounding atmosphere and for supplying a laminar flow of sterile air across the horizontal packaging surface, and a filter disposed in the path of the sterile air between said blower and the horizontal packaging surface of said bench.

3. Apparatus, as set forth in claim 2, wherein means forming a vent in said bench adjacent its horizontal packaging surface and downstream in the path of sterile air flow from the location of the packaging operation for removing the sterile air after it traverses the horizontal packaging surface.

4. Apparatus, as set forth in claim 3, wherein said means forming a vent comprises a grille in said bench, said grille connected to the suction inlet of said blower, another filter positioned between said grille and the suction inlet to said blower for filtering the air sucked into said blower.

5. Apparatus, as set forth in claim 1, wherein said means for conveying the molded articles comprising a chute arranged to contain a supply of sterile air to prevent contamination of the molded articles as they are being conveyed from said molding machine to the packaging surface.

6. Apparatus, as set forth in claim 1, wherein walls forming a room enclose said bench, and said means for providing a flow of sterile air arranged to maintain the quantity of air delivered into said room equal to the quantity of air evacuated from said room for maintaining said room at ambient pressure.

* * * * *